United States Patent
Banton

(10) Patent No.: US 7,376,282 B2
(45) Date of Patent: May 20, 2008

(54) METHOD FOR DESIGNING NEARLY CIRCULARLY SYMMETRIC DESCREENING FILTERS THAT CAN BE EFFICIENTLY IMPLEMENTED IN VLIW (VERY LONG INSTRUCTION WORD) MEDIA PROCESSORS

(75) Inventor: Martin E. Banton, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 799 days.

(21) Appl. No.: 10/717,824

(22) Filed: Nov. 20, 2003

(65) Prior Publication Data

US 2005/0111748 A1 May 26, 2005

(51) Int. Cl.
  *G06K 9/40* (2006.01)
(52) U.S. Cl. ....................... 382/260; 358/461
(58) Field of Classification Search ................ 382/260
   See application file for complete search history.

(56) References Cited

U.S. PATENT DOCUMENTS

| | | | |
|---|---|---|---|
| 5,592,297 A | 1/1997 | Van Dorsselaer | |
| 5,751,862 A * | 5/1998 | Williams et al. | 382/260 |
| 5,818,971 A | 10/1998 | Moolenaar et al. | |
| 5,832,135 A * | 11/1998 | Merhav et al. | 382/260 |
| 5,940,540 A | 8/1999 | Cornelissen | |
| 5,966,503 A | 10/1999 | van Vliembergen et al. | |
| 6,018,596 A * | 1/2000 | Wilkinson | 382/260 |
| 6,028,962 A | 2/2000 | Claassen et al. | |
| 6,078,019 A | 6/2000 | Medici et al. | |
| 6,081,677 A | 6/2000 | Maess et al. | |
| 6,100,994 A | 8/2000 | Schliekelmann et al. | |
| 6,134,565 A | 10/2000 | Hommersom et al. | |
| 6,164,848 A | 12/2000 | Coufal | |
| 6,185,003 B1 | 2/2001 | Oyen | |
| 6,203,140 B1 | 3/2001 | Oyen | |
| 6,226,019 B1 | 5/2001 | Nakano | |
| 6,771,836 B2 * | 8/2004 | Lawton | 382/260 |
| 6,816,622 B2 * | 11/2004 | Blinn et al. | 382/260 |
| 6,983,076 B2 * | 1/2006 | Curry et al. | 382/260 |
| 7,099,519 B2 * | 8/2006 | Barbour et al. | 382/260 |

OTHER PUBLICATIONS

Gelson V. Mendonca, Andreas Antoniou and Anastasios N. Venetsanopoulos, Jan. 1987, vol. CAS-34, No. 1, pp. 1-10.*

* cited by examiner

*Primary Examiner*—Matthew C. Bella
*Assistant Examiner*—Aklilu K Woldemariam

(57) ABSTRACT

A method is disclosed for designing two separable filters, LPP & HPP, that approximates the circularly symmetric frequency response achievable using a non-separable filter. The method selects a cut-off frequency and designs a 1-D low pass filter. Next, the method obtains a low pass 2-D filter and generates a 2-D contour plot therefor. The method designs a 1-D high pass filter and obtains a 2-D high pass filter and a 2-D contour plot therefor. A 2-D filter is generated having the dimensions of the 2-D high pass filter with the only non-zero entry of value 1 located at the center. A matrix is created by subtracting the 2-D high pass filter from the 2-D filter. The low pass 2-D filter is convolved with the matrix to obtain an approximation to a desired circular symmetry.

1 Claim, 1 Drawing Sheet

METHOD FOR DESIGNING NEARLY CIRCULARLY SYMMETRIC DESCREENING FILTERS THAT CAN BE EFFICIENTLY IMPLEMENTED IN VLIW (VERY LONG INSTRUCTION WORD) MEDIA PROCESSORS

FIELD OF THE INVENTION

The present invention generally relates to the field of image processing and, more particularly, to the field of document and image rendering.

BACKGROUND OF THE INVENTION

When dealing with scanned color images, as with scanned monochrome images, one often has to apply a low pass filter to render a scanned image on a printer so that moiré is eliminated. This is done by descreening. The preferred way of descreening is with a circularly symmetric filter so that the same frequency occurring at any angle is descreened by approximately the same amount. A circularly symmetric response is easily achieved using a single, non-separable filter. However, it takes significantly more processing of the image data to apply a non-separable filter to image data than it does to apply a separable filter.

What is needed in this art is an application that achieves a close approximation to the desired circularly symmetric shape while requiring less processing power than is required to implement a non-separable filter.

BRIEF SUMMARY OF THE INVENTION

A method is disclosed for designing two separable filters, LPP & HPP, that, when applied in sequence with a subtraction step, approximates the circularly symmetric frequency response achievable using a non-separable filter. The method of the present invention comprising: First, (a) selecting a cut-off frequency and designing therefrom a 1-D low pass filter LP such that: $LP=[Z_{-n}, Z_{-(n-1)}, \ldots Z_0, \ldots Z_{n-1}, Z_n]$, n is integer. Next, (b) obtaining a 2-D filter LPP by performing the operation: LP* X LP; wherein LP* is a column vector having the same entries as LP and LPP having dimensions given by: {2n+1, 2n+1}; and generating a 2-D countour plot therefor. Next, (c) designing a 1-D high pass filter HP such that: $HP=[Y_{-m}, Y_{-(m-1)}, \ldots Y_0, \ldots Y_{m-1}, Y_m]$ m is integer. Next, (d) obtaining a 2-D filter HPP by performing the operation: HP* X HP; wherein HP* is a column vector having the same entries as HP and HPP having dimensions: {2m+1, 2m+1} and obtaining a 2-D contour plot therefor. Next, (e) repeating (c) through (d) until the 2-D contour plot of HPP overlaps the 2-D countour plot of LPP. Next, (f) generating a 2-D filter ONE having the dimensions of that of HPP with the only non-zero entry of value 1 located at the center of ONE. Next, (g) creating matrix HPPinv by subtracting HPP from ONE. Next, (h) convolving LPP with HPPinv to obtain DSCRN having dimensions: {2m+2n+1, 2m+2n+1}; and obtaining a 2-D contour plot therefor. Next, (i) repeating (a) through (h) until, by an examination of the 2-D contour plot of DSCRN, an approximation to a desired circular symmetry is achieved.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DESCRIPTION OF THE SPECIFICATION

Figure 1:
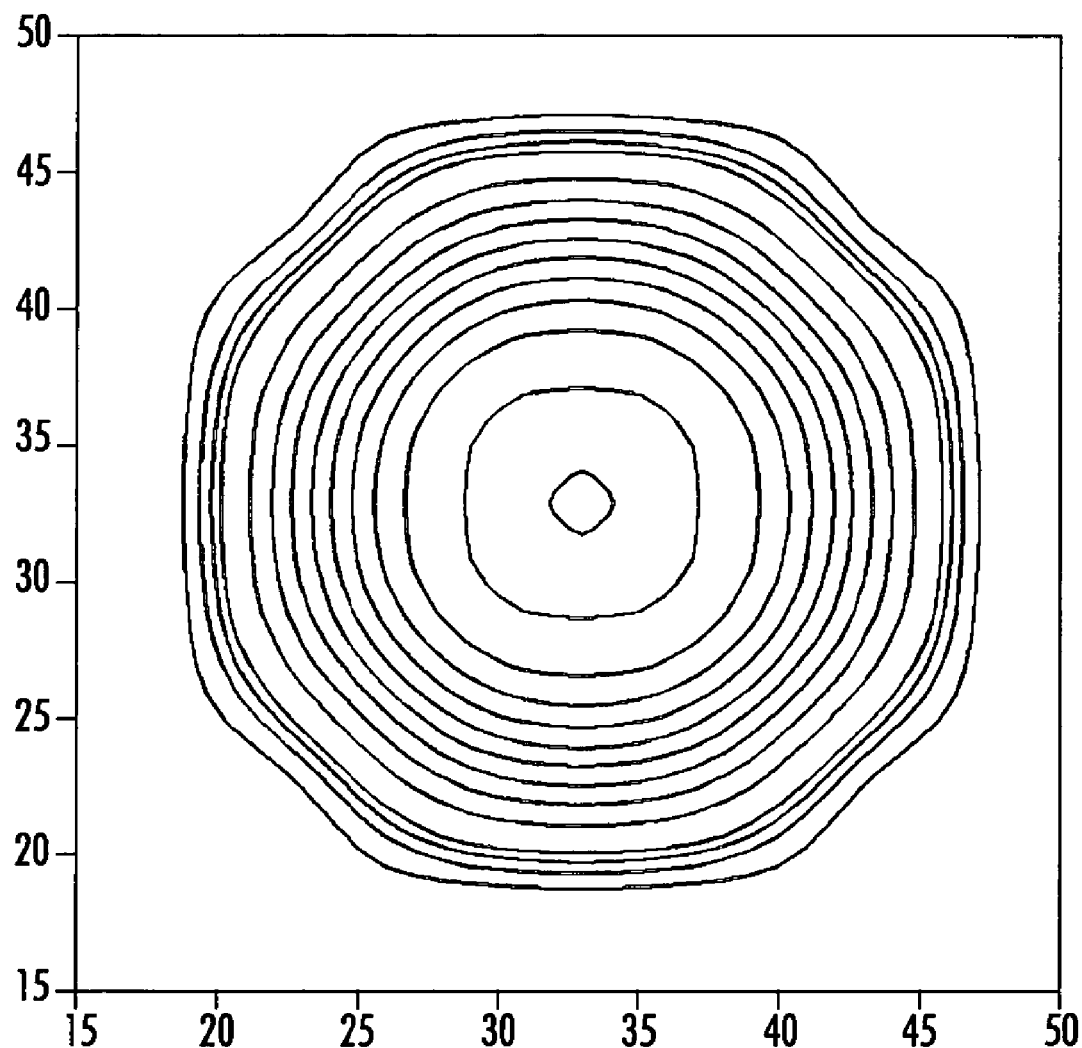
FIG. 1 shows the contour plot of a 2-D low pass filter designed in accordance with the method of the present invention as two sequential separable 1-D filters plus a subtraction function.

It should be understood at the onset hereof that one skilled in this particular field of the arts, specifically that of filter design, would readily understand the sum and substance of the method herein described sufficient to build the filter of the present invention. One skilled in this art would also find the countour plot of FIG. 1 useful in this regard.

It should also be understood that it is not the two separable filters themselves that approximate the result. Rather, the approximation is obtained when the two separable filters are applied to data in a specific way described that the outcome thereof approximates the result achievable by the non-separable filter.

The method of the present invention entails the following:
1. Selecting a cut-off frequency and designing a 1-D low pass filter such that:
   $LP=[Z_{-n}, Z_{-(n-1)}, \ldots Z_0, \ldots Z_{n-1}, Z_n]$, n is integer.
2. Obtaining a 2-D separate filter by performing the matrix operation: LP* X LP=LPP, wherein LP* is a column vector with the same entries as LP; and wherein LPP has dimensions given by: {2n+1, 2n+1}. A 2-D countour plot is generated therefrom.
3. Designing a 1-D high pass filter such that: $HP=[Y_{-m}, Y_{-(m-1)}, \ldots Y_0, \ldots Y_{m-1}, Y_m]$ m is integer.
4. Obtaining a 2-D filter by performing the matrix operation: HP* X HP=HPP, wherein HP* is a column vector having the same entries as HP; and wherein HPP has dimensions given by: {2m+1, 2m+1}. A 2-D countour plot is generated therefrom.
5. Repeating steps 3 and 4 until the 2-D contour plot of HPP overlaps the 2-D countour plot of LPP. Overlap as used herein means until the transition region of HPP overlaps the transition region of LPP.
6. Generating a 2-D filter, ONE, of dimensions of that of HPP with the only non-zero entry of value 1 positioned at the center of ONE.
7. Creating matrix, HPPinv, by subtracting HPP from ONE
8. 8. Convolving LPP with HPPinv to obtain therefrom DSCRN having dimensions given by: {2m+2n+1, 2m+2n+1}. A 2-D countour plot is generated therefrom.
9. Examining the 2-D contour plot of DSCRN and repeating 1 through 8 until an acceptable approximation to the desired circular symmetry is achieved. It should be understood that at (9) if the desired response was not yet achieved then go back to (1) and design a new LPP. To get a new LPP, a new LP needs to be generated. Thereafter a new HPP is again generated until its response properly overlaps that of LPP.

When implementing for a media processor such as that made by Equator Technologies or for a Very Long Instruction Word (VLIW) processor or for a Digital Signal Processor (DSP), one would descreen not by using the non-separable filer DSCRN but by first applying the separable filter LPP and saving that result as, for example, video_1. Then, applying the HPP filter to video_1 and saving that output as, for example, video_2. Then, video_2 would be subtracted from video_1 yielding the descreened output. In this sequence the two filters are both separable. While an examination of the contour plot of the filter DSCRN does give the answer, one could, of course, also apply DSCRN to image data and see if the filter is doing what is desired.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. Method for descreening a digital image comprising:
   (a) selecting a cut-off frequency and designing therefrom a one-dimensional separable low pass filter (LP), one-dimensional separable low pass filter LP being a row vector having entries $[Z_{-n}, Z_{-(n-1)}, \ldots Z_0, \ldots Z_{n-1}, Z_n]$, n is integer;
   (b) obtaining a two-dimensional separable filter (LPP) by performing the operation: LP* X LP, LP* being a column vector having the same entries as one-dimensional separable low pass filter LP, two-dimensional separable filter LPP having dimensions given by: {2n+1, 2n+1}, n is integer;
   (c) generating a two-dimensional contour plot for the two-dimensional filter LPP;
   (d) designing a one-dimensional separable high pass filter (LLP), one-dimensional separable high pass filter HP being a row vector having entries $[Y_{-m}, Y_{-(m-1)}, \ldots Y_0, \ldots Y_{m-1}, Y_m]$, m is integer;
   (e) obtaining a two-dimensional separable filter (HPP) by performing the operation: LLP* X LLP, LLP* being a column vector having the same entries as one-dimensional separable high pass filter LLP, two-dimensional separable filter HPP having dimensions: {2m+1,2m+1}, m is integer;
   (f) generating a two-dimensional contour plot for the two-dimensional filter HPP;
   (g) generating a two-dimensional filter (ONE) when the two-dimensional contour plot for the two-dimensional separable filter LPP overlaps the two-dimensional contour plot for the two-dimensional separable filter HPP, two-dimensional filter ONE having the same dimensions of two-dimensional separable filter HPP with the only non-zero entry of value 1 being located at the center of two-dimensional filter ONE;
   (h) subtracting two-dimensional separable filter HPP from two-dimensional filter ONE to create matrix (HPPinv);
   (i) convolving two-dimensional separable filter LPP with matrix HPPinv to obtain non-separable filter DSCRN having dimensions: {2m+2n+1,2m+2n+1};
   (j) generating a two-dimensional contour plot for non-separable filter DSCRN; and
   (k) selecting two-dimensional separable filter LLP and two-dimensional separable filter HHP when the two-dimensional contour plot for non-separable filter DSCRN is an approximation to a desired circular symmetry;
   (l) repeating (a)-(j) when the two-dimensional contour plot for non-separable filter DSCRN is not an approximation to a desired circular symmetry;
   (m) electronically applying the selected two-dimensional separable filter LLP to a digital image to produce a first filtered image;
   (n) electronically applying the selected two-dimensional separable filter HHP to a digital image to produce a second filtered image; and
   (o) subtracting the second filtered image from the first filtered image to, generate a descreened digital image.

* * * * *